United States Patent
Herrfurth et al.

(10) Patent No.: US 8,662,101 B2
(45) Date of Patent: Mar. 4, 2014

(54) DEVICE FOR INSERTING A SHUT-OFF DEVICE IN A PIPELINE

(75) Inventors: Werner Herrfurth, Westerhausen (DE); Thomas Vogt, Bad Suderode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 167 days.

(21) Appl. No.: 13/320,206

(22) PCT Filed: May 10, 2010

(86) PCT No.: PCT/EP2010/002849
§ 371 (c)(1),
(2), (4) Date: Nov. 11, 2011

(87) PCT Pub. No.: WO2010/130387
PCT Pub. Date: Nov. 18, 2010

(65) Prior Publication Data
US 2012/0048395 A1 Mar. 1, 2012

(30) Foreign Application Priority Data
May 12, 2009 (DE) .......................... 10 2009 020 875

(51) Int. Cl.
*F16K 5/00* (2006.01)
(52) U.S. Cl.
USPC ............ 137/315.11; 137/315.33; 137/315.41; 137/454.2; 137/515.5
(58) Field of Classification Search
USPC ............. 137/315.06, 315.07, 315.11, 315.33, 137/315.41, 454.2, 454.6, 515, 515.5, 137/515.7; 166/85.3, 88.3, 196, 332.4, 138; 285/382.7; 29/235
See application file for complete search history.

(56) References Cited

U.S. PATENT DOCUMENTS 1,647,873 A * 11/1927 Lockwood ..................... 137/512
2,333,470 A * 11/1943 Cowles .......................... 285/115
(Continued)

FOREIGN PATENT DOCUMENTS

DE          9319910 U1     3/1994
DE         20116899 U1    12/2001
(Continued)

OTHER PUBLICATIONS

English language abstract not available for DE 9319910; however, see English language equivalent US 5,755,259. Orginial document extracted from the espacenet.com database, 10 pages, Mar. 24, 1994.

(Continued)

*Primary Examiner* — Eric Keasel
*Assistant Examiner* — Jessica Cahill
(74) *Attorney, Agent, or Firm* — Howard & Howard Attorneys PLLC

(57) ABSTRACT

A device suitable for retrofitting in laid pipelines is intended to be able to be placed and fixed in place in the pipeline. Transport of the device to the installation location is intended to be performed using as little force as necessary, and the sealing element is intended to be displaced without contact and thus without wear. To this end, the device, in the interior of which a shut-off device (6) is disposed, is designed so that an offset, conically tapering region (10) is adjacent to a front cylindrical region (3) and is bounded by a stop collar (12) on which a connecting contour (7) for a coupling piece of a drive element is connected. A sliding piece (13) made of an expandable material is displaceably disposed in the axial direction on the conically tapering region (10), comprising a circumferential groove in which a spring-loaded clamping ring (15) is supported.

7 Claims, 2 Drawing Sheets

(56) References Cited

U.S. PATENT DOCUMENTS

Figure 1:
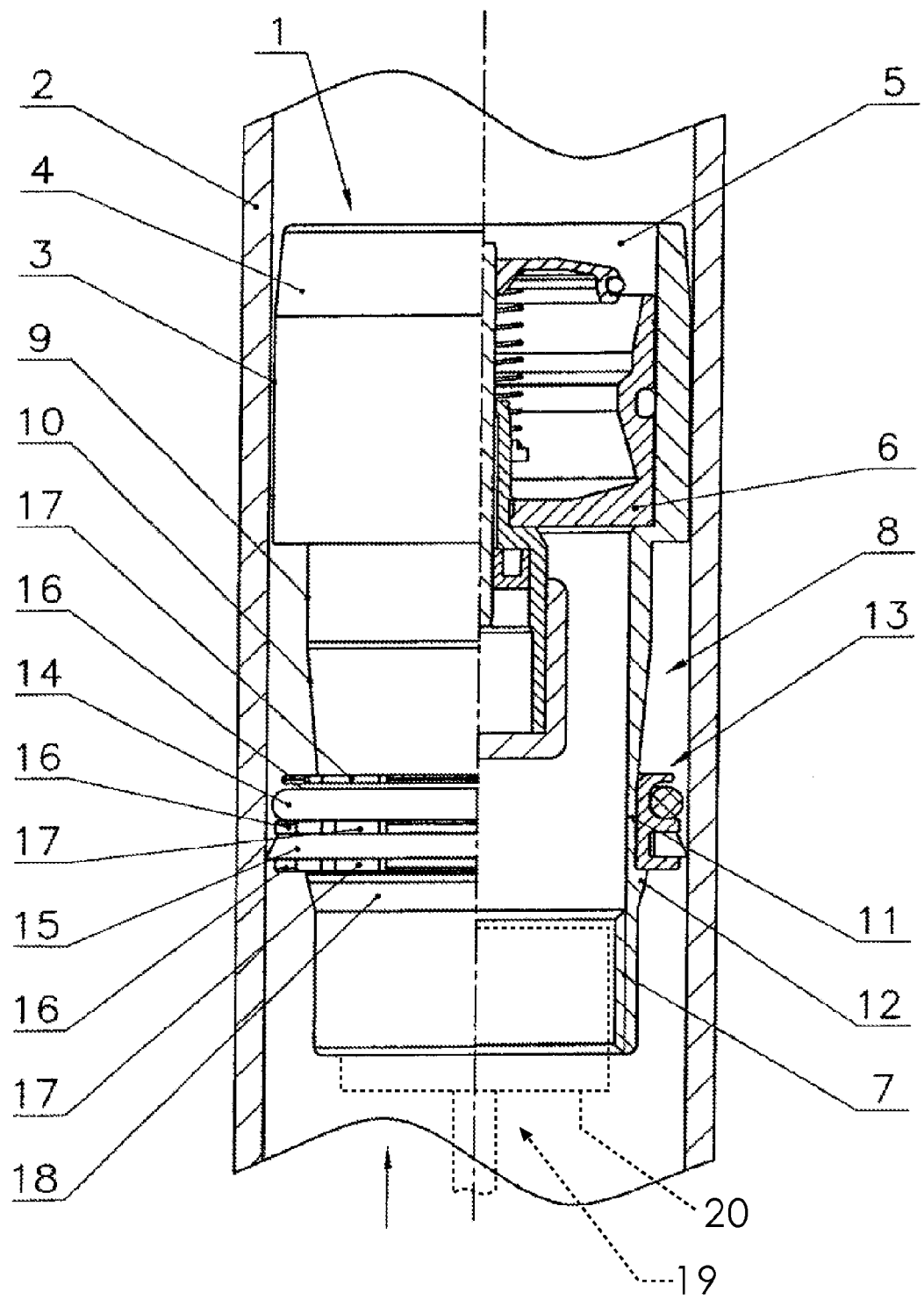

| | | | |
|---|---|---|---|
| 2,771,091 A * | 11/1956 | Baker et al. | 137/542 |
| 2,802,482 A * | 8/1957 | Arnhold | 137/315.08 |
| 3,180,420 A * | 4/1965 | Manson, Jr. et al. | 166/133 |
| 3,419,040 A * | 12/1968 | Thibodeaux | 137/515.7 |
| 3,893,716 A * | 7/1975 | Moreiras et al. | 285/3 |
| 5,293,898 A | 3/1994 | Masloff | |
| 5,755,259 A | 5/1998 | Schulze et al. | |
| 6,892,756 B2 * | 5/2005 | Schulze | 137/517 |
| 6,929,023 B2 * | 8/2005 | Whitaker et al. | 137/315.33 |
| 7,389,791 B2 * | 6/2008 | Fangmeier | 137/493.9 |
| 8,056,574 B2 * | 11/2011 | Erickson et al. | 137/15.18 |
| 2008/0210310 A1 * | 9/2008 | Gilcher | 137/215 |

FOREIGN PATENT DOCUMENTS

| | | |
|---|---|---|
| DE | 10115676 A1 | 10/2002 |
| DE | 10324041 A1 | 1/2005 |
| DE | 202005001685 U1 | 5/2005 |
| GB | 1299876 | 12/1972 |
| WO | WO9201184 A1 | 1/1992 |

OTHER PUBLICATIONS

English language abstract not available for DE 20116899; however, see English language machine-assisted translation extracted from the espacenet.com database on Aug. 10, 2012, 22 pages.

English language abstract and machine-assisted translation for DE 10115676 extracted from the espacenet.com database on Aug. 10, 2012, 8 pages.

English language abstract and machine-assisted translation for DE 10324041 extracted from the espacenet.com database on Aug. 10, 2012, 14 pages.

English language abstract and machine-assisted translation for DE 202005001685 extracted from the espacenet.com database on Aug. 10, 2012, 13 pages.

English language abstract for WO9201184 extracted from the espacenet.com database on Aug. 10, 2012, 35 pages.

* cited by examiner

DEVICE FOR INSERTING A SHUT-OFF DEVICE IN A PIPELINE

CROSS-REFERENCE TO RELATED APPLICATIONS

This application claims priority to and the benefit of PCT Application No. PCT/EP2010/002849 filed May 12, 2010, which claims priority to and the benefit of German Patent Application No. 10 2009 020 875.5 filed May 12, 2009.

TECHNICAL FIELD OF THE INVENTION

The invention relates to a device for inserting a shut-off device in a pipeline according to the preamble to claim 1.

PRIOR ART

Shut-off devices for shutting off fluid-conducting pipelines exist in a multitude of embodiments. They can be operated manually or automatically. In automatic operation the closed position is adopted when preset parameters such as an impermissible increase in flow rate or temperature are exceeded. The shut-off devices are normally inserted at the designated places within the pipeline as it is being laid.

An example of these devices is the safety shut-off device for a gas line described in WO 92/01184 A1. As can be seen from FIG. 1, the housing comprises a pipe section fitted on both its ends with a thread which is used to screw in place the safety shut-off device within the pipeline at the designated location as the gas line is being laid.

A connecting element which is disposed within the pipelines and into which the shut-off device is inserted can also be used. It is therefore known from the utility model DE 93 19 910 U1 for the shut-off device to be inserted into a so-called electrofusion coupler of the type used for joining plastic pipelines.

The disadvantage of these solutions is that a subsequent installation in a pipeline that has already been laid can only be carried out at very great expense by exposing and cutting the pipeline. Such a level of expenditure is no longer acceptable for pipelines that have already been laid underground.

A shut-off device for gas-conducting pipelines, a so-called gas flow monitor, is described in DE 103 24 041 B4. This gas flow monitor can be installed in a gas line at the optimum location for its safety function and fixed in position there. To that end the gas flow monitor is fastened in a thrust piece which for its part can be screwed in place by a clamping ring. On its side facing away from the expanding ring the clamping ring has spring elastic elements which prevent its turning in the pipeline. In addition, an expanding ring is disposed on the circumference of the thrust piece and is deformed and increases in diameter as the thrust piece is screwed in place by the clamping ring.

The disadvantage of this solution, apart from its complicated structure and the unavoidably high costs of production of the individual components, is that the sealing element is precompressed right at the start of the insertion of the device into the pipeline. Apart from the increased exertion of force over the course of the joining path to the required installation location, the main effect of this precompression is that the sealing element is subjected to a high level of wear, especially if the inner wall is dry. In addition, the spring elastic functional components create notches on the inner wall of the pipeline over the entire joining path owing to the reverse rotation forces that arise during pressing, and this has a long-term effect at the installation location.

STATEMENT OF INVENTION

The invention addresses the problem of devising a device for inserting a shut-off device in a pipeline which has as simple a structure as possible and is suitable for retrofitting in pipelines that have already been laid. It is intended to be capable of being installed at a position in the pipeline where it can best perform its function and of being fixed in place there. At the same time the device is intended to be transported to the installation location using as little force as necessary and in particular the sealing element is intended to be displaced without contact and thus without wear, while at the same time ensuring that the inner seal between the device and the internal diameter of the pipeline remains intact.

The problem is solved according to the invention in that the device for inserting a shut-off device in a pipeline comprises a tubular housing in whose interior a shut-off device is disposed, and which is designed so that an offset region conically tapering towards the direction of insertion is adjacent to the front cylindrical region of the housing looked at from the direction of insertion whose external diameter is slightly smaller than the internal diameter of the pipeline, with said offset region bounded by a stop collar on which a connecting contour for a coupling piece of a drive element known per se is connected. A sliding piece made of an expandable material whose diameter when lying against the stop collar is slightly smaller than the internal diameter of the pipeline and which comprises a circumferential groove in which a spring-loaded clamping ring is supported, is displaceably disposed in the axial direction on the conically tapering region.

This arrangement provides a solution to the problems referred to above.

Additional advantageous embodiments of the invention are set out in the other claims. The structure can therefore be simplified for example by connecting the housing to the shut-off device in one piece. In this arrangement the shut-off device can comprise for example a gas flow monitor for automatically shutting off gas lines.

Furthermore, it has proved advantageous to taper the diameter of the clamping ring in the direction of insertion in order to facilitate the insertion of the device into the pipeline and its insertion movement within the pipeline.

A further advantageous embodiment can be achieved if the two end regions of the conical region each comprise an additional cylindrical region in order to prevent an axially acting force component being exerted in the two final positions.

The sliding piece can have a second groove in which an O-ring is mounted in order to further ensure that the inner seal between the device and the internal diameter of the pipeline remains intact.

Where an O-ring is used to ensure the inner seal is intact, the force arising on the insertion of the device can be reduced by inserting one or more axial slots on the radial bars on the sliding piece.

EXECUTION EXAMPLE

Figure 2:
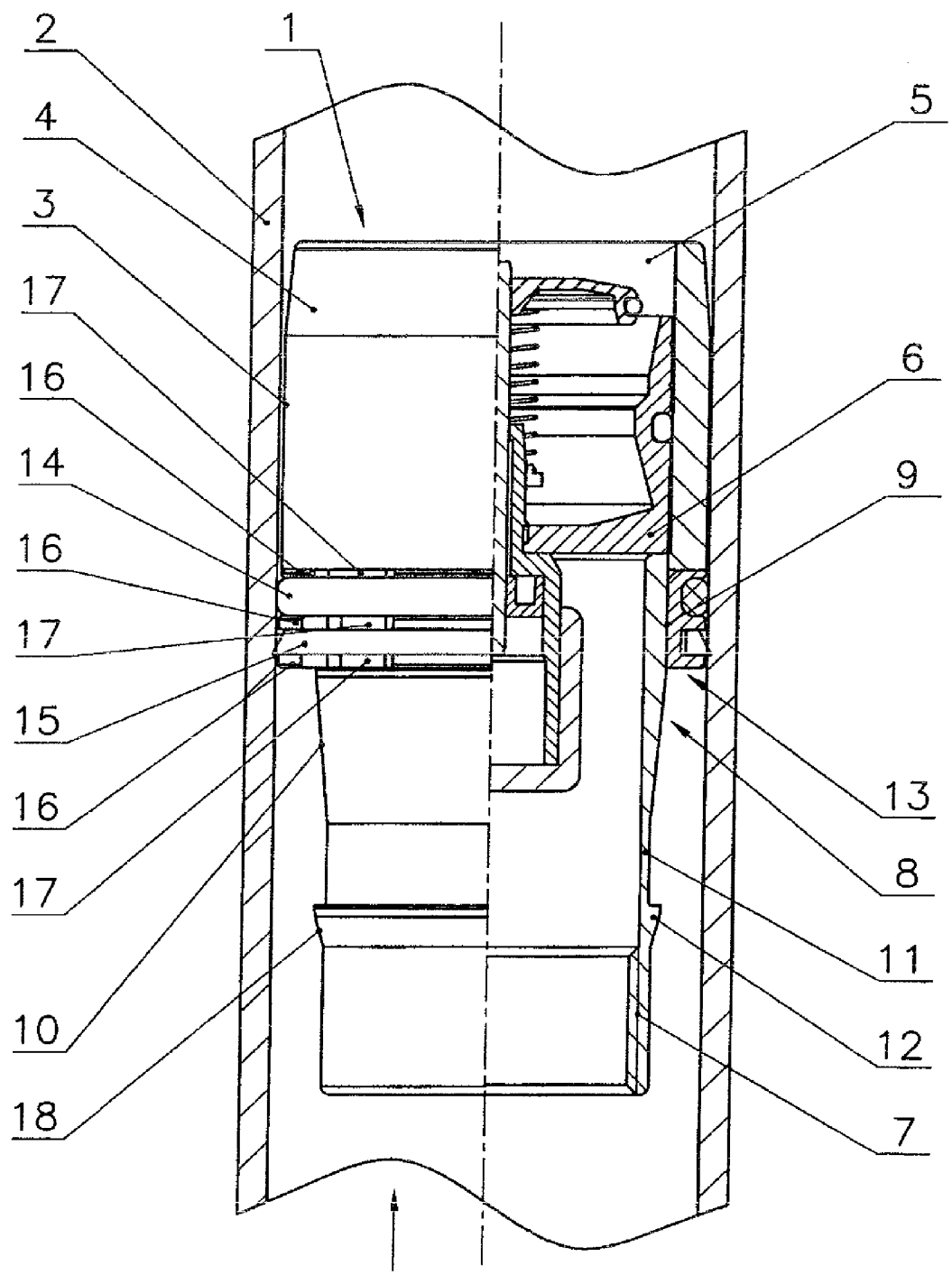

The invention is now to be described in more detail by an execution example in which reference will be made to the following illustrations:

FIG. 1 a partly sectional view of a device according to the invention in the insertion position FIG. 2 the device according to the invention from FIG. 1 in the final position FIG. 1 shows an exemplary embodiment of a device according to the invention for inserting a shut-off device in a pipeline with the device already inserted in a pipe line 2 at the time of the insertion movement to the installation location. For the sake of clarity the direction of insertion has been indicated by a directional arrow in the illustration. The device can be installed at any location in flexible expandable pipes made for example from polyethylene as well as in rigid pipes made for example from steel. The device can be transported in the pipeline 2 to the designated installation location by means of a drive element (19) known per se, such as a flexible shaft.

The device according to the invention comprises a tubular housing 1 whose external diameter has been so determined that it can be inserted into the pipeline 2. In order to facilitate insertion into the pipeline 2 the cylindrical region 3, which has the largest diameter, is fitted at the starting side with a tapered insertion point 4 in the direction of insertion.

A shut-off device 6, in this case a gas flow monitor, is inserted gastight into a turned recess 5 in the interior of the housing 1. Since the structure and mode of operation of a gas flow monitor are known to those skilled in the art, a further description and explanation of the details of this device have not been given in this execution example.

At its end side looked at from the direction of insertion the housing 1 has a connecting contour, in the execution example a connecting thread 7, for connecting to a coupling piece 20 of the drive element 19 which has already been mentioned above. A bayonet joint or the like can of course also be used depending on the coupling piece.

The external contour of the housing 1 has an offset region 8 at its connection point to the cylindrical region 3. This offset region changes from an initial cylindrical part 9 into a conically tapering region 10 and ends in a second cylindrical part 11.

A sliding piece 13 mounted so as to be axially displaceable on the second cylindrical part 11 and made of an expandable material such as polyethylene rests in the initial state on a stop collar 12 shutting off the offset region 8. On its side facing away from the offset region 8 the stop collar 12 is fitted with a taper 18 to facilitate the mounting of the sliding piece 13 onto the housing 1.

The sliding piece 13 is fitted with two grooves on its surface. Whereas one of the grooves serves to receive an O-ring 14 serving to ensure gas tightness, a slotted metallic clamping ring 15, whose diameter in its sprung back state exceeds the internal diameter of the pipeline 2 and which tapers in the direction of insertion, is spring-mounted in the other groove. The position and parameters of O-ring 14 and clamping ring 15 that are selected are such that the sealing effect of the O-ring is not impaired by the clamping ring 15 in the installed condition shown in FIG. 2 and described in greater detail below. In addition, each of the circumferential bars formed on the surface of the sliding piece 13 by the two grooves 16 which have been inserted have four slots 17 equally distributed over the circumference.

The installation and mode of operation of the device for inserting a shut-off device in a pipeline described in this execution example are as follows:

The device shown in the execution example in FIG. 1 is connected as described above by the coupling piece to a flexible shaft which is not illustrated. The device is then inserted by means of the flexible shaft into the pipeline 2, with the sliding piece 13 located on the second cylindrical region 11. The diameter of the sliding piece 13, as well as the external diameter of the O-ring 14 installed, is smaller than the internal diameter of the pipeline 2, whereas the spring-loaded clamping ring 15 adjusts to this diameter and slides along the wall. The insertion movement is continued until the designated installation location has been reached.

After the installation location has been reached, a tensile force is exerted against the direction of insertion to fix the position of the device by means of the flexible shaft. FIG. 2 shows the device illustrated in FIG. 1 at the time the device is fixed in position at the installation location in the pipeline 2.

The tensile force exerted causes the clamping ring 15 to be pressed onto or into the wall of the pipeline depending on the material from which the pipeline 2 is made so that the sliding piece 13 is held in a stationary position. The conical region 10 slides under the sliding piece 13 and leads to an expansion of said sliding piece until the sliding piece 13 is located on the first cylindrical part 9. This expansion causes the O-ring 14 as well to be pressed onto the inner wall to provide the required seal, with the slots 17 distributed over the circumference of the bars (16) serving to reduce the force expended during the expansion.

The coupling piece is then released from the device, an operation which is effected in this case by a rotational movement, and the flexible shaft is conveyed outwards with the coupling piece. This operation concludes the installation in the pipeline 2.

LIST OF REFERENCE NUMERALS

1 Housing
2 Pipeline
3 Cylindrical region
4 Tapered insertion point
5 Turned recess
6 Shut-off device
7 Connecting thread
8 Offset region
9 First cylindrical region
10 Conical region
11 Second cylindrical region
12 Stop collar
13 Sliding piece
14 O-ring
15 Clamping ring
16 Bar
17 Slot
18 Taper

The invention claimed is:

1. A device for inserting a shut-off device in a pipeline, characterized in that the device comprises a tubular housing (1) and a shut-off device (6) disposed in the tubular housing, and that the external diameter of the housing (1) in a front cylindrical region (3) looked at from the direction of insertion is smaller than the internal diameter of the pipeline (2), and that an offset region (10) conically tapering towards the direction of insertion is adjacent to the front cylindrical region (3), with said offset region bounded by a stop collar (12) on which a connecting contour (7) for a coupling piece (20) of a drive element (19) is connected, wherein a sliding piece (13) made of an expandable material, whose external diameter when lying against the stop collar (12) is smaller than the internal diameter of the pipeline (2), and which comprises a circumferential groove in which a spring-loaded clamping ring (15) is supported, is displaceably disposed in the axial direction on the offset region (10).

2. A device for inserting a shut-off device in a pipeline in accordance with claim 1, characterized in that the housing (1) is connected to the shut-off device (6).

3. A device for inserting a shut-off device in a pipeline in accordance with claim 1, characterized in that the shut-off device (6) comprises a gas flow monitor for the automatic shutting-off of gas lines.

4. A device for inserting a shut-off device in a pipeline in accordance with claim 1, characterized in that the diameter of the clamping ring (15) tapers in the direction of insertion.

5. A device for inserting a shut-off device in a pipeline in accordance with claim 1, characterized in that the offset region (10) has an additional cylindrical region (9; 11) at each of its two end regions.

6. A device for inserting a shut-off device in a pipeline in accordance with claim 1, characterized in that the sliding piece (13) has a second groove in which an O-ring (14) is supported.

7. A device for inserting a shut-off device in a pipeline in accordance with claim 6, characterized in that the sliding piece (13) includes radial bars (16) having one or more axial slots (17).

\* \* \* \* \*